US010719999B2

(12) United States Patent
Love et al.

(10) Patent No.: US 10,719,999 B2
(45) Date of Patent: Jul. 21, 2020

(54) TECHNOLOGIES FOR DETERMINING INTENT IN AN ACCESS CONTROL SYSTEM

(71) Applicant: Schlage Lock Company LLC, Carmel, IN (US)

(72) Inventors: Devin A. Love, Carmel, IN (US); Joseph W. Baumgarte, Carmel, IN (US); Ryan C. Kincaid, Indianapolis, IN (US)

(73) Assignee: Schlage Lock Company LLC, Carmel, IN (US)

( * ) Notice: Subject to any disclaimer, the term of this patent is extended or adjusted under 35 U.S.C. 154(b) by 0 days.

(21) Appl. No.: 15/498,755

(22) Filed: Apr. 27, 2017

(65) Prior Publication Data

US 2018/0315262 A1 Nov. 1, 2018

(51) Int. Cl.
*H04W 4/02* (2018.01)
*H04B 17/318* (2015.01)
*G07C 9/00* (2020.01)

(52) U.S. Cl.
CPC .................... *G07C 9/00309* (2013.01); *G07C 2009/00769* (2013.01); *G07C 2209/63* (2013.01)

(58) Field of Classification Search
None
See application file for complete search history.

(56) References Cited

U.S. PATENT DOCUMENTS 9,196,104 B2 11/2015 Dumas et al.
9,218,696 B2 12/2015 Dumas et al.
9,336,637 B2 5/2016 Neil et al.
9,378,598 B2 6/2016 Dumas et al.
9,512,643 B1 * 12/2016 Keefe .................... E05B 47/06
2006/0164208 A1 * 7/2006 Schaffzin ........... G07C 9/00182 340/5.64
2009/0002246 A1 * 1/2009 Rabinovich .......... H01Q 1/3241 343/713

(Continued)

FOREIGN PATENT DOCUMENTS

WO 2017180688 A1 10/2017

OTHER PUBLICATIONS

Developing Beacons with Bluetooth Low Energy (BLE) Technology; Silicon Laboratories; http://www.silabs.com/products/wirelessibluetooth/developing-beacons-with-bluetooth-low-energy-ble-technology; (last visited Apr. 27, 2017).

(Continued)

*Primary Examiner* — John F Mortell
(74) *Attorney, Agent, or Firm* — Taft Stettinius & Hollister LLP

(57) ABSTRACT

A method according to one embodiment includes determining, by an access control device that controls access to a passageway, a location of a mobile device relative to the access control device based on a signal distance traveled and an angle of arrival of a signal received by the access control device from the mobile device, determining whether the location of the mobile device relative to the access control device is a location that indicates an intent of the user of the mobile device to access the passageway, and unlocking a lock mechanism of the access control device in response to a determination that the location of the mobile device relative to the access control device indicates that the user intends to access the passageway.

19 Claims, 8 Drawing Sheets

(56) References Cited

U.S. PATENT DOCUMENTS

| | | | | |
|---|---|---|---|---|
| 2010/0201482 | A1 | 8/2010 | Robertson et al. | |
| 2012/0032850 | A1* | 2/2012 | Nakagawa | G01S 3/74 342/378 |
| 2014/0148196 | A1 | 5/2014 | Bassan-Eskenazi et al. | |
| 2015/0121465 | A1 | 4/2015 | Berns et al. | |
| 2015/0213663 | A1* | 7/2015 | Dumas | G07C 9/27 340/5.31 |
| 2016/0350992 | A1* | 12/2016 | Telljohann | G07C 9/00309 |
| 2017/0303090 | A1* | 10/2017 | Stitt | G01S 5/02 |
| 2018/0052217 | A1* | 2/2018 | Jonsson | G01S 3/50 |
| 2018/0242105 | A1* | 8/2018 | Sute | H04W 4/023 |

OTHER PUBLICATIONS

Angle of arrival; Wikipedia; https://en.wikipedia.org/wiki/Angle_of_arrival; (last visited Apr. 27, 2017). Feb. 26, 2016.

What do you want to track? Whatever you want to track, Quuppa brings you the dot on the map.; Quuppa—Do More With Location; http://quuppa.com/; (last visited Apr. 27, 2017).

Indoor Location Positioning Technology: Research, Solutions & Trends; Grizzly Analytics; http://www.grizzlyanalytics.com/report_2015_02_indoor.html; (last visited Apr. 27, 2017).

International Search Report; International Searching Authority; International Patent Application No. PCT/US2018/029781; dated Jul. 13, 2018; 3 pages.

Written Opinion; International Searching Authority; International Patent Application No. PCT/US2018/029781; dated Jul. 13, 2018; 7 pages.

* cited by examiner

TECHNOLOGIES FOR DETERMINING INTENT IN AN ACCESS CONTROL SYSTEM

BACKGROUND

Access control systems typically involve the use of credentials to manage the operation of an access control device (e.g., a lock device). Such credentials may be assigned to a particular user or device and are often physical in nature, forming at least a portion of, for example, a smartcard, proximity card, key fob, token device, or mobile device. Thus, current credential systems generally require an interaction between the credential and a reader device (e.g., on or secured to the access control device) such that the reader device may read the credential and determine whether access should be granted. In particular, a user may be required to swipe, tap, or otherwise present the credential to the reader device. As such, access control systems generally require an active physical action on behalf of the user in order to grant the user access via the access control device.

SUMMARY

According to one aspect, a method according to one embodiment may include determining, by an access control device that controls access to a passageway, a location of a mobile device relative to the access control device based on a signal distance traveled and an angle of arrival of a signal received by the access control device from the mobile device; determining, by the access control device, whether the location of the mobile device relative to the access control device is a location that indicates an intent of the user of the mobile device to access the passageway; and unlocking, by the access control device, a lock mechanism of the access control device in response to a determination that the location of the mobile device relative to the access control device indicates that the user intends to access the passageway.

In some embodiments, determining the location of the mobile device relative to the access control device may include determining the signal distance traveled of the signal based on a time of flight of the signal. In some embodiments, determining the location of the mobile device relative to the access control device may include estimating the signal distance traveled based on a received signal strength indicator of the signal. In some embodiments, determining the location of the mobile device relative to the access control device may include determining the angle of arrival of the signal based on measurements of a time difference of arrival at a plurality of antennas in an antenna array of the access control device. In some embodiments, determining the location of the mobile device relative to the access control device may include determining a distance of the mobile device relative to the access control device based on the signal distance traveled. Further, determining whether the location of the mobile device relative to the access control device is a location that indicates that the user intends to access the passageway may include determining whether the distance is within a threshold distance and the angle of arrival is within a threshold angle.

In some embodiments, the method may further include authenticating the mobile device to determine whether the user of the mobile device is authorized to access the passageway. Further, unlocking the lock mechanism may include unlocking the lock mechanism in response to a determination that the location of the mobile device relative to the access control device indicates that the user intends to access the passageway and the user of the mobile device is authorized to access the passageway.

In some embodiments, the method may further include determining, by the access control device, whether the mobile device is moving toward the access control device. Further, unlocking the lock mechanism may include unlocking the lock mechanism in response to a determination that the location of the mobile device relative to the access control device indicates that the user intends to access the passageway, the user of the mobile device is authorized to access the passageway, and the mobile device is moving toward the access control device. In some embodiments, the method may further include monitoring, by the access control device, for mobile devices nearby the access control device based on received signals.

According to another aspect, an access control device may include an access control mechanism adapted to control access to a passageway, an antenna array including a plurality of antennas, a processor, and a memory comprising a plurality of instructions stored thereon that, in response to execution by the processor, causes the access control device to determine a location of a mobile device relative to the access control device based on a signal distance traveled and an angle of arrival of a signal received from the mobile device, determine whether the location of the mobile device relative to the access control device is a location that indicates an intent of the user of the mobile device to access the passageway, and control the access control mechanism to allow access to the passageway in response to a determination that the location of the mobile device relative to the access control device indicates that the user intends to access the passageway.

In some embodiments, to determine the location of the mobile device relative to the access control device may include to determine the signal distance traveled of the signal based on a time of flight of the signal. In some embodiments, to determine the location of the mobile device relative to the access control device may include to estimate the signal distance traveled based on a received signal strength indicator of the signal. In some embodiments, to determine the location of the mobile device relative to the access control device may include to determine the angle of arrival of the signal based on measurements of a phase difference of the signal at a time of arrival of the signal at the plurality of antennas. In some embodiments, to determine the location of the mobile device relative to the access control device may include to determine a distance of the mobile device relative to the access control device based on the signal distance traveled. Further, to determine whether the location of the mobile device relative to the access control device is a location that indicates that the user intends to access the passageway may include to determine whether the distance is within a threshold distance and the angle of arrival is within a threshold angle.

In some embodiments, the plurality of instructions may further cause the access control device to authenticate the mobile device to determine whether the user of the mobile device is authorized to access the passageway. Further, in some embodiments, the access control mechanism may include a lock mechanism, and to control the access control mechanism may include to unlock the lock mechanism in response to a determination that the location of the mobile device relative to the access control device indicates that the user intends to access the passageway and the user of the mobile device is authorized to access the passageway.

In some embodiments, the plurality of instructions may further cause the access control device to determine whether the mobile device is moving toward the access control device. Further, to control the access control mechanism may include to control the access control mechanism to allow access to the passageway in response to a determination that the location of the mobile device relative to the access control device indicates that the user intends to access the passageway, the user of the mobile device is authorized to access the passageway, and the mobile device is moving toward the access control device.

According to yet another aspect, an access control system may include a mobile device, an access control device, and a gateway device. The access control device may include a lock mechanism to control access to a passageway. The gateway device may include an antenna array and may be configured to determine a location of the mobile device relative to the gateway device based on a signal strength and an angle of arrival of a signal received by the antenna array from the mobile device, determine a location of the mobile device relative to the access control device based on the location of the mobile device relative to the gateway device, and determine whether the location of the mobile device relative to the access control device is a location that indicates an intent of a user of the mobile device to access the passageway. The access control device may be configured to unlock the lock mechanism in response to a determination that the location of the mobile device relative to the access control device indicates that the user intends to access the passageway.

In some embodiments, to determine the location of the mobile device relative to the gateway device may include to determine a distance of the mobile device from the gateway device based on a received signal strength indicator associated with the signal, to determine the location of the mobile device relative to the gateway device may include to determine the angle of arrival of the signal based on measurements of a time difference of arrival at a plurality of antennas in the antenna array of the gateway device, and to determine whether the location of the mobile device relative to the access control device is a location that indicates that the user intends to access the passageway may include to determine whether the distance is within a threshold distance and the angle of arrival is within a threshold angle.

In some embodiments, to unlock the lock mechanism may include to unlock the lock mechanism in response to a determination that the location of the mobile device relative to the access control device indicates that the user intends to access the passageway, the user of the mobile device is authorized to access the passageway, and the mobile device is moving toward the access control device.

Further embodiments, forms, features, and aspects of the present application shall become apparent from the description and figures provided herewith.

BRIEF DESCRIPTION OF THE DRAWINGS

The concepts described herein are illustrative by way of example and not by way of limitation in the accompanying figures. For simplicity and clarity of illustration, elements illustrated in the figures are not necessarily drawn to scale. Where considered appropriate, references labels have been repeated among the figures to indicate corresponding or analogous elements.

DETAILED DESCRIPTION

Figure 1:
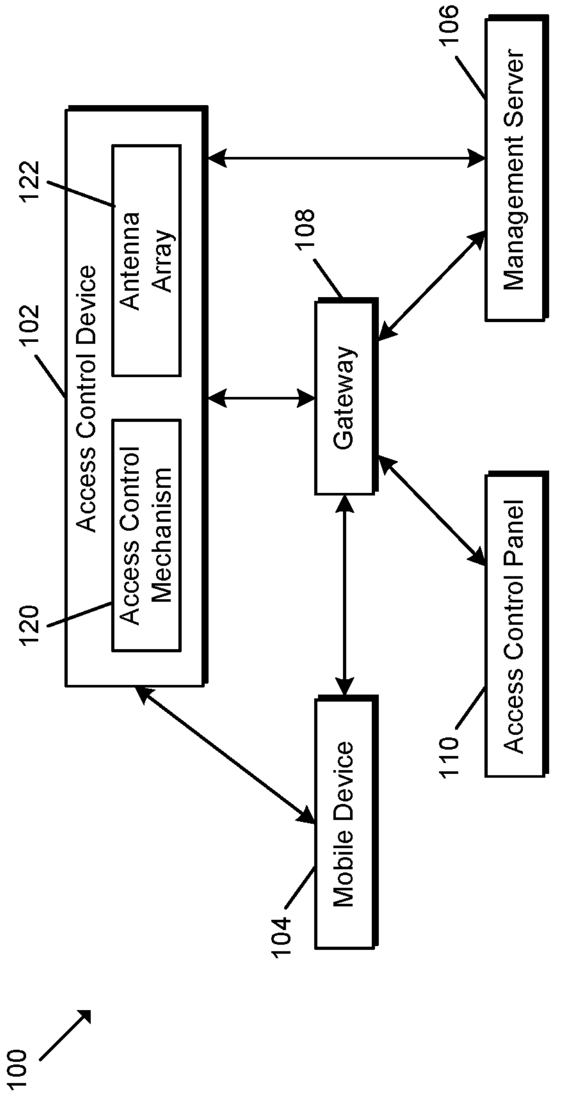
FIG. 1 is a simplified block diagram of at least one embodiment of a system for determining an access control intent.

Although the concepts of the present disclosure are susceptible to various modifications and alternative forms, specific embodiments have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. It should further be appreciated that although reference to a "preferred" component or feature may indicate the desirability of a particular component or feature with respect to an embodiment, the disclosure is not so limiting with respect to other embodiments, which may omit such a component or feature. Further, when a particular feature, structure, or characteristic is described in connection with an embodiment, it is submitted that it is within the knowledge of one skilled in the art to implement such feature, structure, or characteristic in connection with other embodiments whether or not explicitly described. Additionally, it should be appreciated that items included in a list in the form of "at least one of A, B, and C" can mean (A); (B); (C); (A and B); (B and C); (A and C); or (A, B, and C). Similarly, items listed in the form of "at least one of A, B, or C" can mean (A); (B); (C); (A and B); (B and C); (A and C); or (A, B, and C). Further, with respect to the claims, the use of words and phrases such as "a," "an," "at least one," and/or "at least one portion" should not be interpreted so as to be limiting to only one such element unless specifically stated to the contrary, and the use of phrases such as "at least a portion" and/or "a portion" should be interpreted as encompassing both embodiments including only a portion of such element and embodiments including the entirety of such element unless specifically stated to the contrary.

The disclosed embodiments may, in some cases, be implemented in hardware, firmware, software, or a combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures unless indicated to the contrary. Additionally, the inclusion of a structural or method feature in a particular figure is not meant to imply that such feature is required in all embodiments and, in some embodiments, may not be included or may be combined with other features.

The terms longitudinal, lateral, and transverse may be used to denote motion or spacing along three mutually perpendicular axes, wherein each of the axes defines two opposite directions. The directions defined by each axis may also be referred to as positive and negative directions. Additionally, the descriptions that follow may refer to the directions defined by the axes with specific reference to the orientations illustrated in the figures. For example, the directions may be referred to as distal/proximal, left/right, and/or up/down. It should be appreciated that such terms may be used simply for ease and convenience of description and, therefore, used without limiting the orientation of the system with respect to the environment unless stated expressly to the contrary. For example, descriptions that reference a longitudinal direction may be equally applicable to a vertical direction, a horizontal direction, or an off-axis orientation with respect to the environment. Furthermore, motion or spacing along a direction defined by one of the axes need not preclude motion or spacing along a direction defined by another of the axes. For example, elements described as being "laterally offset" from one another may also be offset in the longitudinal and/or transverse directions, or may be aligned in the longitudinal and/or transverse directions. The terms are therefore not to be construed as further limiting the scope of the subject matter described herein.

Referring now to FIG. 1, in the illustrative embodiment, an access control system 100 for determining a user's intent to access a passageway controlled by an access control device 102 includes the access control device 102 and a mobile device 104. Additionally, in some embodiments, the access control system 100 may also include a management server 106, a gateway device 108, and/or an access control panel 110.

As described in detail below, the access control device 102 may control access to a passageway (e.g., through a doorway) via an access control mechanism 120 based on an intent of the user of the mobile device 104 (e.g., a smartphone) inferred based on wireless communication signals received from the mobile device 104. In particular, the access control device 102 may determine the location of the mobile device 104 relative to the access control device 102 based on a signal distance traveled (e.g., based on a distance determined from a time-of-flight (TOF) of the signal) or an estimation thereof (e.g., estimated based on RSSI) and an angle of arrival (e.g., an angle of arrival (AoA) determined based on measurements of a time difference of arrival at the antennas in an antenna array 122) of a wireless signal (e.g., a Bluetooth communication signal) received from the mobile device 104. Further, the access control device 102 may determine whether the relative location of the mobile device 104 corresponds with a location indicative of a user's intent to access the passageway (e.g., based on one or more threshold distances, threshold angles, and/or previously stored intent locations). If the relative location indicates that the user intends to access the passageway (i.e., the user intends to control the access control mechanism 120, such as by unlocking a lock mechanism), in some embodiments, the access control device 102 may automatically control the access control mechanism 120 without requiring user input or a physical action by the user. As such, it should be appreciated that the techniques described herein permit the access control system 100 to perform autonomous access control through a passageway controlled by an access control device 102 by inferring the user's intent from wireless signal characteristics.

In other embodiments, the gateway device 108 and/or the mobile device 104 may be configured to perform one or more of the functions of the access control device 102 described above. For example, in some embodiments, the mobile device 104 may include the antenna array 122 and be configured to perform the "intent-determining" functions described herein as being performed predominantly by the access control device 102. For example, in such embodiments, the mobile device 104 may determine the location of the access control device 102 relative to the mobile device 104 based on a signal distance traveled (or estimation thereof) and angle of arrival of a wireless signal received from the access control device 102, and the mobile device 104 may determine whether the relative location of the access control device 102 to the mobile device 104 (or the mobile device 104 relative to the access control device 102) corresponds with an intent location. In other embodiments, the gateway device 108 may perform the analytics or a portion thereof, For example, the gateway device 108 may include the antenna array 122 and receive a wireless communication signal from the mobile device 104, determine the location of the mobile device 104 relative to the gateway device 108 based on the distance traveled of the received signal or estimation thereof (e.g., determined/estimated via TOF or RSSI) and angle of arrival of a signal received from the mobile device 104, and determine the location of mobile device 104 relative to the access control device 102 based on its location relative to the gateway device 108 (e.g., from known spatial relationships between the access control device 102 and the gateway device 108). Additionally, the gateway device 108 may further communicate with a management server 106 and/or an access control panel 110.

In some embodiments, the access control device 102 may communicate with the management server 106 over a Wi-Fi connection and/or with the mobile device 104 over a Bluetooth connection. Additionally, the access control device 102 may communicate with the management server 106 and/or the access control panel 110 via the gateway device 108. As such, in the illustrative embodiment, the access control device 102 may communicate with the gateway device 108 over a Wi-Fi connection and/or a Bluetooth connection, and the gateway device 108 may, in turn, forward the communicated data to the relevant management server 106 and/or access control panel 110. In particular, in some embodiments, the gateway device 108 may communicate with the access control panel 110 over a serial communication link (e.g., using RS-485 standard communication), and the gateway device 108 may communicate with the management server 106 over a Wi-Fi connection, an Ethernet connection, or another wired/wireless communication connection. As such, it should be appreciated that the access control device 102 may communicate with the management server 106 via an online mode with a persistent real-time communication connection or via an offline mode (e.g., periodically or in response to an appropriate condition) depending on the particular embodiment. As indicated above, in other embodiments, it should be appreciated that the access control device 102 may communicate with the devices of the management server 106 via another suitable communication protocol.

Further, in some embodiments, the management server 106 may communicate with multiple access control devices 102 at a single site (e.g., a particular building) and/or across multiple sites. That is, in such embodiments, the management server 106 may be configured to receive data from access control devices 102 distributed across a single building, multiple buildings on a single campus, or across multiple locations.

In some embodiments, the management server 106 may be configured to manage credentials of the access control system 100. For example, the management server 106 may be responsible for ensuring that the access control device 102 has updated authorized credentials, whitelists, blacklists, device parameters, and/or other suitable data. Similarly, in some embodiments, the management server 106 may be responsible for registering mobile devices 104 with the access control system 100 and distributing appropriate credentials to the mobile device 104 for authorized access to the access control device 102. Additionally, in some embodiments, the management server 106 may receive security data, audit data, raw sensor data, and/or other suitable data from the access control device 102 for management of the access control system 100. In some embodiments, the management server 106 may be embodied as an online server or a cloud-based server.

It should be appreciated that each of the access control device 102, the mobile device 104, the management server 106, the gateway device 108, and/or the access control panel 110 may be embodied as a computing device similar to the computing device 200 described below in reference to FIG. 2. For example, in the illustrative embodiment, each of the access control device 102, the mobile device 104, the management server 106, the gateway device 108, and the access control panel 110 includes a processing device 202 and a memory 206 having stored thereon operating logic 208 for execution by the processing device 202 for operation of the corresponding device.

Figure 2:
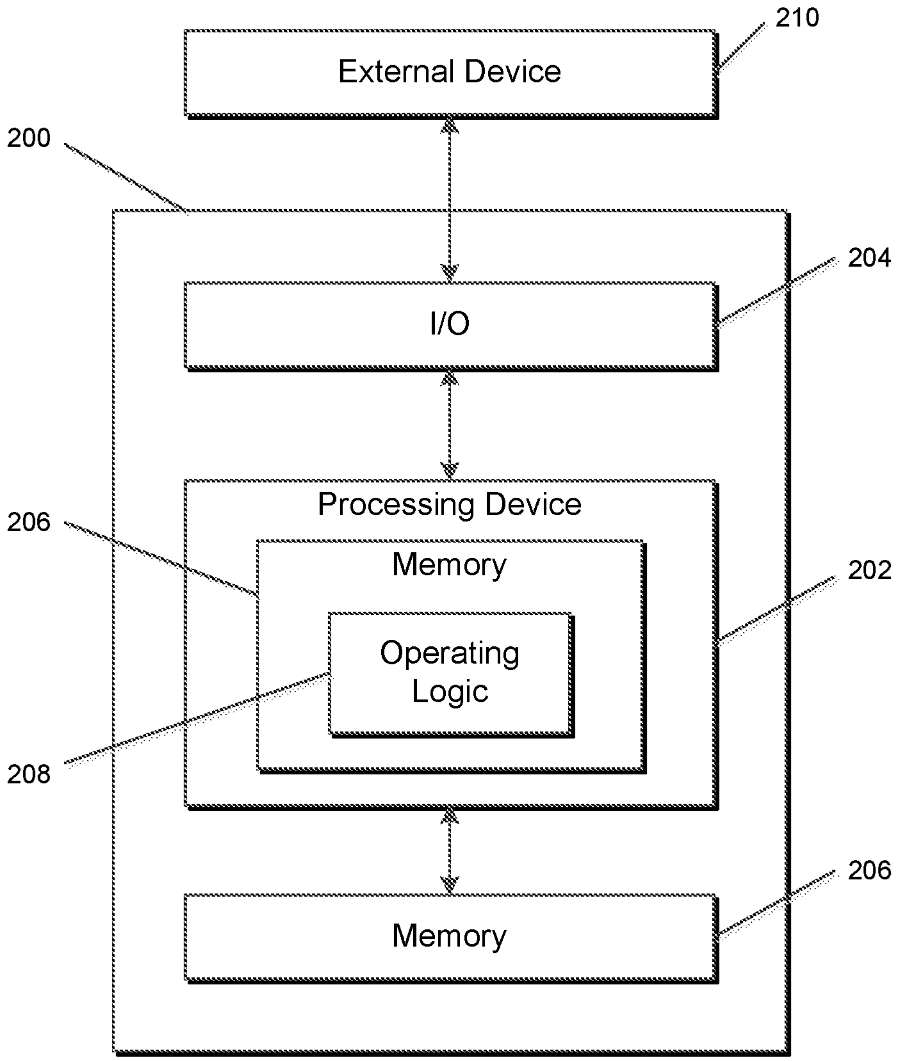
FIG. 2 is a simplified block diagram of at least one embodiment of a computing system.

Referring now to FIG. 2, a simplified block diagram of at least one embodiment of a computing device 200 is shown. The illustrative computing device 200 depicts at least one embodiment of an access control device, mobile device, management server, gateway device, and/or access control panel that may be utilized in connection with the access control device 102, the mobile device 104, the management server 106, the gateway device 108, and/or the access control panel 110 illustrated in FIG. 1. Depending on the particular embodiment, computing device 200 may be embodied as a reader device, credential device, access control device, server, desktop computer, laptop computer, tablet computer, notebook, netbook, Ultrabook™, mobile computing device, cellular phone, smartphone, wearable computing device, personal digital assistant, Internet of Things (IoT) device, control panel, processing system, router, gateway, and/or any other computing, processing, and/or communication device capable of performing the functions described herein.

The computing device 200 includes a processing device 202 that executes algorithms and/or processes data in accordance with operating logic 208, an input/output device 204 that enables communication between the computing device 200 and one or more external devices 210, and memory 206 which stores, for example, data received from the external device 210 via the input/output device 204.

The input/output device 204 allows the computing device 200 to communicate with the external device 210. For example, the input/output device 204 may include a transceiver, a network adapter, a network card, an interface, one or more communication ports (e.g., a USB port, serial port, parallel port, an analog port, a digital port, VGA, DVI, HDMI, FireWire, CAT 5, or any other type of communication port or interface), and/or other communication circuitry. Communication circuitry may be configured to use any one or more communication technologies (e.g., wireless or wired communications) and associated protocols (e.g., Ethernet, Bluetooth®, Wi-Fi®, WiMAX, etc.) to effect such communication depending on the particular computing device 200. The input/output device 204 may include hardware, software, and/or firmware suitable for performing the techniques described herein.

The external device 210 may be any type of device that allows data to be inputted or outputted from the computing device 200. For example, in various embodiments, the external device 210 may be embodied as the access control device 102, the mobile device 104, the management server 106, the gateway device 108, and/or the access control panel 110. Further, in some embodiments, the external device 210 may be embodied as another computing device, switch, diagnostic tool, controller, printer, display, alarm, peripheral device (e.g., keyboard, mouse, touch screen display, etc.), and/or any other computing, processing, and/or communication device capable of performing the functions described herein. Furthermore, in some embodiments, it should be appreciated that the external device 210 may be integrated into the computing device 200.

The processing device 202 may be embodied as any type of processor(s) capable of performing the functions described herein. In particular, the processing device 202 may be embodied as one or more single or multi-core processors, microcontrollers, or other processor or processing/controlling circuits. For example, in some embodiments, the processing device 202 may include or be embodied as an arithmetic logic unit (ALU), central processing unit (CPU), digital signal processor (DSP), and/or another suitable processor(s). The processing device 202 may be a programmable type, a dedicated hardwired state machine, or a combination thereof. Processing devices 202 with multiple processing units may utilize distributed, pipelined, and/or parallel processing in various embodiments. Further, the processing device 202 may be dedicated to performance of just the operations described herein, or may be utilized in one or more additional applications. In the illustrative embodiment, the processing device 202 is of a programmable variety that executes algorithms and/or processes data in accordance with operating logic 208 as defined by programming instructions (such as software or firmware) stored in memory 206. Additionally or alternatively, the operating logic 208 for processing device 202 may be at least partially defined by hardwired logic or other hardware. Further, the processing device 202 may include one or more components of any type suitable to process the signals received from input/output device 204 or from other components or devices and to provide desired output signals. Such components may include digital circuitry, analog circuitry, or a combination thereof.

The memory 206 may be of one or more types of non-transitory computer-readable media, such as a solid-state memory, electromagnetic memory, optical memory, or a combination thereof. Furthermore, the memory 206 may be volatile and/or nonvolatile and, in some embodiments, some or all of the memory 206 may be of a portable variety, such as a disk, tape, memory stick, cartridge, and/or other suitable portable memory. In operation, the memory 206 may store various data and software used during operation of the computing device 200 such as operating systems, applications, programs, libraries, and drivers. It should be appreciated that the memory 206 may store data that is manipulated by the operating logic 208 of processing device 202, such as, for example, data representative of signals received from and/or sent to the input/output device 204 in addition to or in lieu of storing programming instructions defining operating logic 208. As shown in FIG. 2, the memory 206 may be included with the processing device 202 and/or coupled to the processing device 202 depending on the particular embodiment. For example, in some embodiments, the processing device 202, the memory 206, and/or other components of the computing device 200 may form a portion of a system-on-a-chip (SoC) and be incorporated on a single integrated circuit chip.

In some embodiments, various components of the computing device 200 (e.g., the processing device 202 and the memory 206) may be communicatively coupled via an input/output subsystem, which may be embodied as circuitry and/or components to facilitate input/output operations with the processing device 202, the memory 206, and other components of the computing device 200. For example, the input/output subsystem may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations.

The computing device 200 may include other or additional components, such as those commonly found in a typical computing device (e.g., various input/output devices and/or other components), in other embodiments. It should be further appreciated that one or more of the components of the computing device 200 described herein may be distributed across multiple computing devices. In other words, the techniques described herein may be employed by a computing system that includes one or more computing devices. Additionally, although only a single processing device 202, I/O device 204, and memory 206 are illustratively shown in FIG. 2, it should be appreciated that a particular computing device 200 may include multiple processing devices 202, I/O devices 204, and/or memories 206 in other embodiments. Further, in some embodiments, more than one external device 210 may be in communication with the computing device 200.

As indicated above, the illustrative access control device 102 includes an access control mechanism 120 and an antenna array 122. The access control mechanism 120 is configured to control access through a passageway. For example, in some embodiments, the access control mechanism 120 may be embodied as a lock mechanism configured to be positioned in a locked state in which access to the passageway is denied, or may be positioned in an unlocked state in which access to the passageway is permitted. In some embodiments, the lock mechanism includes a deadbolt, latch bolt, lever, and/or other mechanism adapted to move between the locked and unlocked state and otherwise perform the functions described herein. However, it should be appreciated that the access control mechanism 120 may be embodied as any another mechanism suitable for controlling access through a passageway in other embodiments.

The antenna array 122 includes a plurality of antennas positioned apart from one another such that a signal is received by the various antennas at different points in time, thereby permitting the access control device 102 to determine the angle of arrival (AoA) of the signal based, for example, on the time difference of arrival of the signal at the various antennas of the antenna array 122. It should be appreciated that, in some embodiments, the time difference of arrival of the signal at the various antennas may be measured based on the difference in phase of the received signals at each of the antennas in the antenna array 122. Depending on the particular embodiment, the antennas of the antenna array 122 may be selected and/or positioned to permit a two-dimensional determination of the angle of arrival or a three-dimensional determination of the angle of arrival. In the illustrative embodiment, the antenna array 122 includes at least three antennas; however, the antenna array 122 may include a different number of antennas in another embodiment. For example, the number of antennas may be selected based on the desired accuracy of the angle of arrival determination. In various embodiments, the antennas may be embodied as chip antennas, whip antennas, trace antennas, and/or other suitable antennas. It should be appreciated that the illustrative antenna array 122 is configured to receive and/or process Bluetooth (e.g., Bluetooth Low Energy (BLE)) communication signals. In other embodiments, the antenna array 122 may be configured to receive and/or process signals over Wi-Fi (e.g., infrastructure or ad hoc mode), Wi-Fi Direct, Zigbee, Near Field Communication (NFC), IEEE 802.15, and/or another suitable wireless communication protocol.

Figure 3:
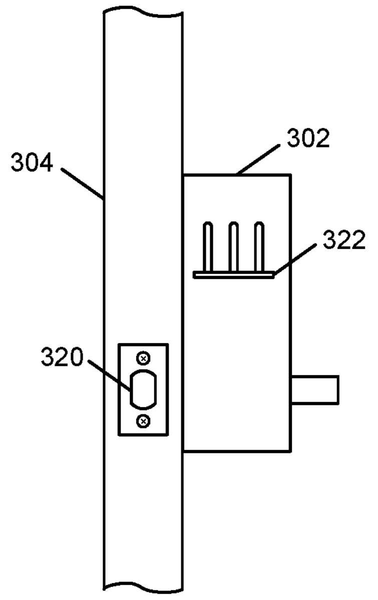
FIG. 3 is side view of at least one embodiment of an access control device of the system of FIG. 1.
Figure 4:
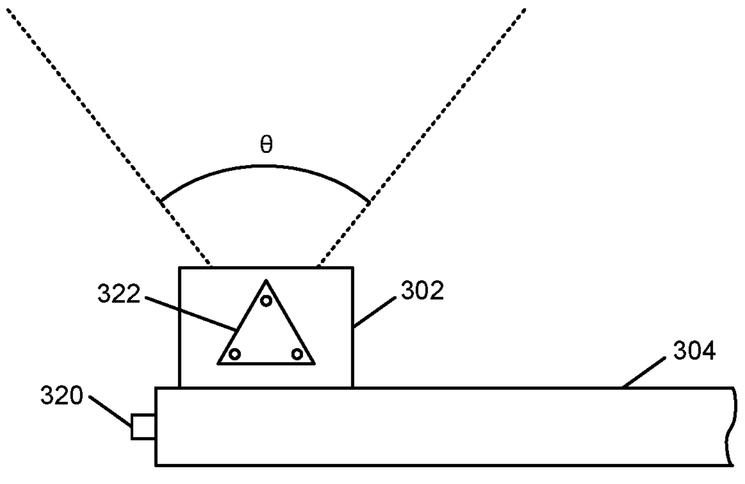
FIG. 4 is a top view of the access control device of FIG. 3.

In some embodiments, the access control device 102 may be embodied as a lock device similar to the access control device 302 of FIGS. 3-4, which is secured to a door 304 and configured to control passage through the door 304. As shown, the illustrative access control device 302 includes a lock mechanism 320 and an antenna array 322, which may be similar to the access control mechanism 120 and the antenna array 122 described above. In particular, the illustrative lock mechanism 320 includes a deadbolt, latch bolt, lever, and/or other mechanism that may be positioned in a locked state to secure the door 304 and prevent passage through the door 304 (i.e., when the door 304 is closed) or may be positioned in an unlocked state to allow passage through the door 304.

Figure 5:
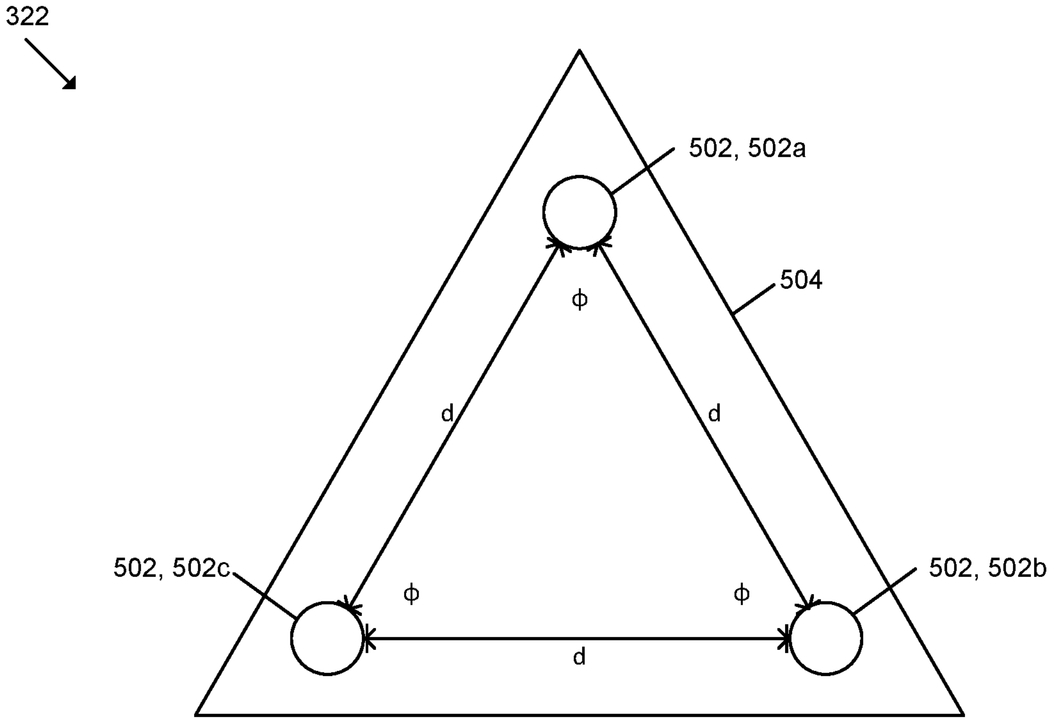
FIG. 5 is a top view of at least one embodiment of an antenna array of the access control device of FIG. 1.
Figure 6:
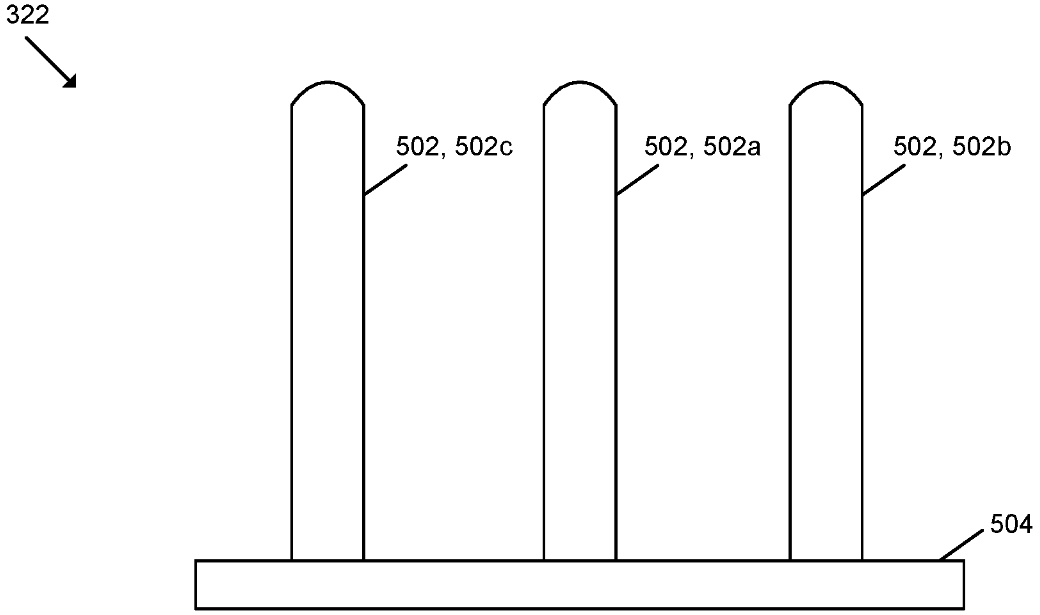
FIG. 6 is a side view of the antenna array of FIG. 5.

As described above, the antenna array 322 includes a plurality of antennas 502 positioned apart from one another such that a signal is received by the various antennas 502 at different points in time, thereby permitting the access control device 102 to determine the angle of arrival of the signal. In particular, as shown in FIGS. 5-6, the illustrative antenna array 322 includes three antennas 502*a-c*, which are embodied as whip antennas. Further, in the illustrative embodiment, the antennas 502*a-c* are evenly distributed in an equilateral triangle formation. More specifically, in the illustrative embodiment, the antenna 502*a* is positioned a distance, d, away from each of the antennas 502*b-c*, and the antenna 502*b* is positioned the same distance, d, away from the antenna 502*c*. Similarly, in the illustrative embodiment, the angle, ∠abc, between the antennas 502*a*, 502*b*, 502*c* has the measurement, $\phi$, which is equal to the measurement of the angle, ∠acb, between the antennas 502_a_, 502_c_, 502_b_ and the angle, ∠cab, between the antennas 502_c_, 502_a_, 502_b_. It should be appreciated, however, that the antennas 502 may be otherwise positioned in other embodiments. Further, in other embodiments, the antenna array 122 may, additionally or alternatively, include one or more other types of antennas. In some embodiments, the antenna array 122 may include multiple different types of antennas. Further, in some embodiments, each of the antennas of the antenna array 122 may be embodied as an omnidirectional antenna with approximately 360 degrees of vertical beamwidth and/or 360 degrees of horizontal beamwidth. In other embodiments, one or more of the antennas may have a limited beamwidth in one or more directions.

In the illustrative embodiment, each of the antennas 502 is secured to a printed circuit board (PCB) 504 that is electrically and/or communicatively coupled to the processing device 202 of the access control device 302. In other embodiments, the PCB 504 may be omitted, and the antennas 502 may be coupled to the processing device 202, the memory 206, and/or other components of the access control device 302 via other circuitry. Further, in some embodiments, the PCB 504 may be embodied as multiple PCBs.

Figure 7:
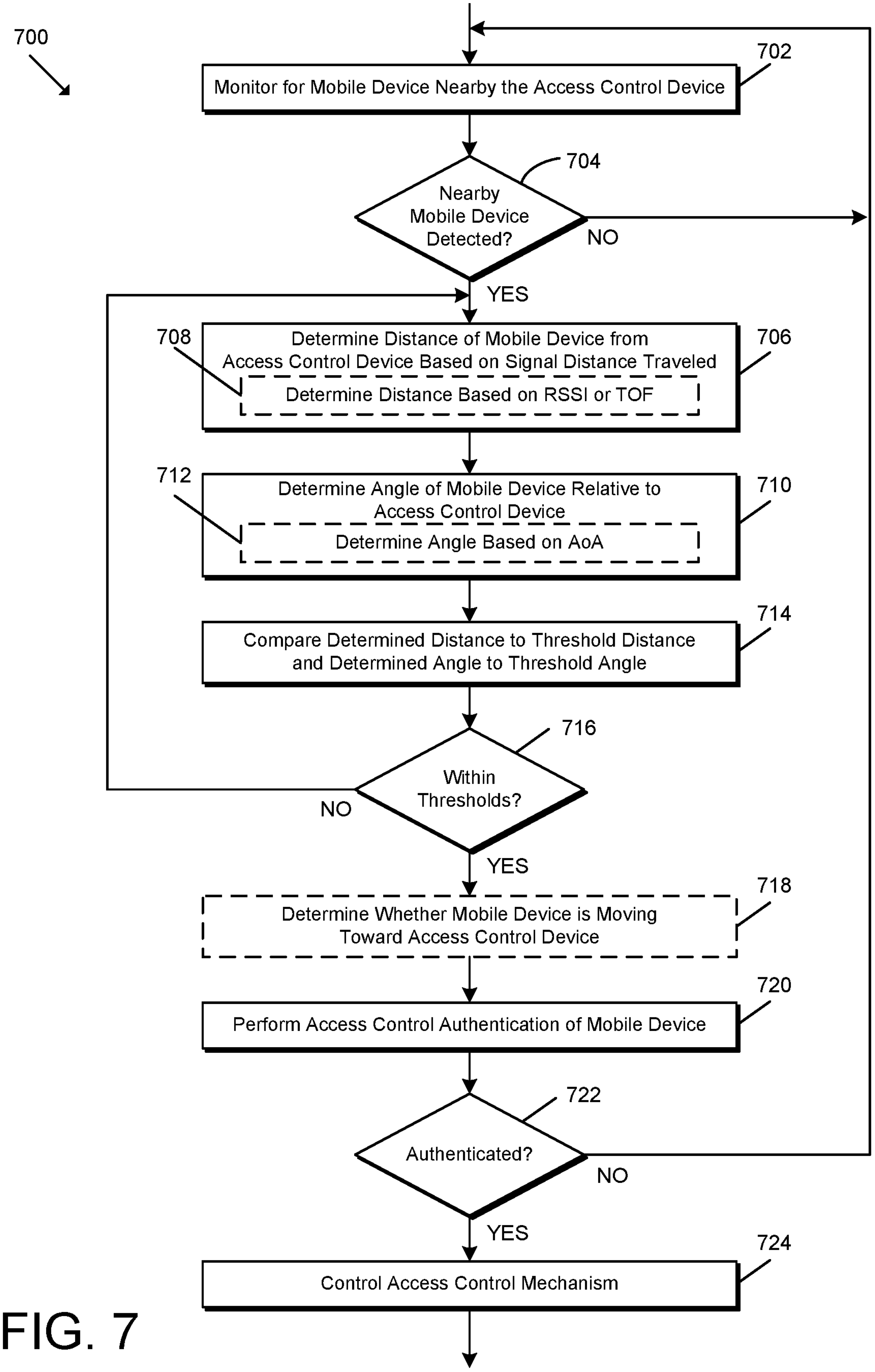
FIG. 7 is a simplified block diagram of at least one embodiment of a method for determining an access control intent.

Referring now to FIG. 7, in use, the access control device 102 may execute a method 700 for determining an access control intent of a user of a mobile device 104. It should be appreciated that the particular blocks of the method 700 are illustrated by way of example, and such blocks may be combined or divided, added or removed, and/or reordered in whole or in part depending on the particular embodiment, unless stated to the contrary. The illustrative method 700 begins with block 702 in which the access control device 102 monitors for a mobile device 104 nearby the access control device 102. In doing so, the access control device 102 may be attempting to ascertain which mobile devices 104 may be close enough to the access control device 102 that an access control intent may be reasonably inferred. For example, in some embodiments, the access control device 102 may monitor for one or more communication protocol advertisements (e.g., Bluetooth beacon messages) to be received from a mobile device 104 within a communication range of the access control device 102. In other embodiments, the access control device 102 may advertise itself (e.g., via Bluetooth or another suitable communication protocol) and await a response from a mobile device 104 within a communication range of the access control device 102.

In block 704, the access control device 102 determines whether a nearby mobile device 104 has been identified. If not, the method 700 returns to block 702 in which the access control device 102 continues to monitor for nearby mobile devices 104. If a nearby mobile device 104 has been detected, the method 700 advances to block 706 in which the access control device 102 determines a distance of the mobile device 104 from the access control device 102 based on the signal distance traveled (or estimation thereof) of a communication signal (e.g., a Bluetooth message) received by the antenna array 122 of the access control device 102 from the mobile device 104. In some embodiments, in block 708, the access control device 102 may determine/estimate the distance based on a received signal strength indicator (RSSI) or time-of-flight (TOF) of a signal. In other embodiments, the access control device 102 may determine the relative distance of the mobile device 104 based on another suitable technique and/or mechanism In block 710, the access control device 102 determines an angle of the mobile device 104 relative to the access control device 102. In doing so, in block 712, the access control device 102 may determine the angle of the mobile device 104 relative to the access control device 102 based on an angle of arrival (AoA) of a communication signal received by the antenna array 122 from the mobile device 104. In particular, the access control device 102 may determine the AoA of the signal based on measurements of a time difference of arrival at a plurality of antennas of the antenna array 122. For example, in some embodiments, the access control device 102 may measure the difference in phase of the signal at the various antennas when the signal is received. In other embodiments, the access control device 102 may determine the relative angle of the mobile device 104 based on another suitable technique and/or mechanism.

In some embodiments, it should be appreciated that the access control device 102 may determine both the relative distance and relative angle of the mobile device 104 based on the same received signal. Further, in some embodiments, the access control device 102 may extract the distance information (e.g., RSSI data) and/or the angle information (e.g., AoA) data from a field (e.g., a supplemental field) of a packet received according to a BLE packet structure.

In block 714, the access control device 102 determines the location of the mobile device 104 relative to the access control device 102 based on the determined distance and angle, and determines whether that location is indicative of an intent by the user of the mobile device 104 to access the passageway (e.g., a doorway secured by the access control device 102). More specifically, the access control device 102 compares the determined distance to a threshold distance to determine whether the mobile device 104 is within a threshold distance, and the access control device 102 compares the determined angle to a threshold angle to determine whether the mobile device 104 is within a threshold angle.

If the access control device 102 determines, in block 716, that the determined distance is not within the threshold distance and/or the determined angle is not within the threshold angle, the method 700 returns to block 706 in which the access control device 102 again determines the relative distance/angle of the mobile device 104. In other words, the access control device 102 may monitor the location of the mobile device 104 over time as the mobile device 104 moves relative to the access control device 102. It should be appreciated that, in some embodiments, the access control device 102 may determine and analyze the relative distance and relative angle of the mobile device 104 in parallel or in another order. Further, in some embodiments, if the access control device 102 determines that one of those thresholds has been exceeded, the method 700 may return to block 706 without consideration of the other threshold. Additionally, in some embodiments, it should be appreciated that the access control device 102 may monitor the location of, and perform the functions described herein with respect to, multiple mobile devices 104 simultaneously.

Figure 9:
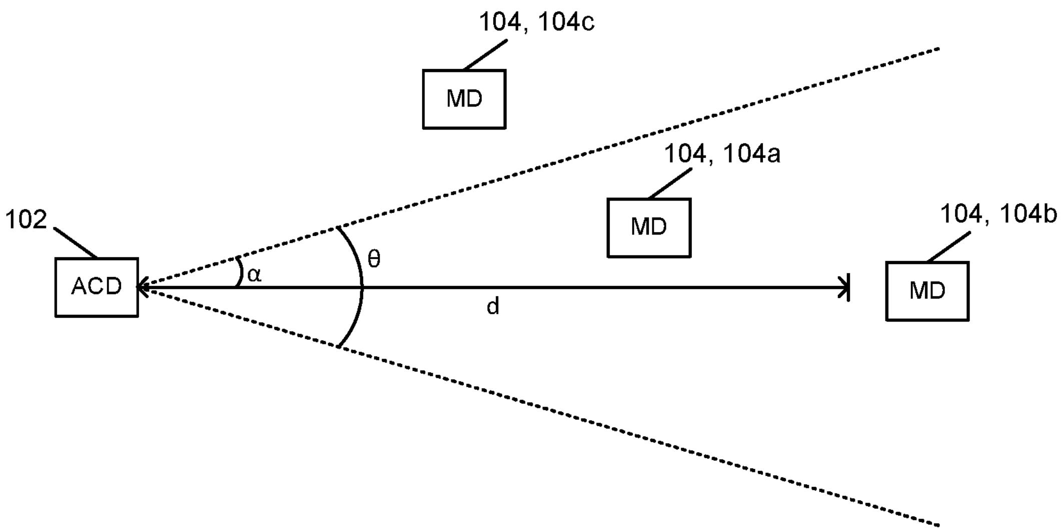
FIGS. 9 and 10 illustrate various intent locations defined by a distance and angle relative to the access control device of FIG. 1.

If the access control device 102 determines, in block 716, that the determined distance is within the threshold distance and the determined angle is within the threshold angle, the access control device 102 determines that the mobile device 104 is within an intent location that is indicative of the user's intent to access the passageway controlled by the access control device 102. As described above and shown in FIG. 9, the access control device 102 may store, or otherwise "know," a predetermined threshold distance, d, and a predetermined threshold angle, θ, that define intent locations. It should be appreciated that the threshold angle, θ, may be referenced in some instances by the half-angle, $\alpha=\theta/2$, for simplicity or clarity of the description. The environment of FIG. 9 depicts three mobile devices 104_a-c_ nearby the access control device 102. As shown, it should be appreciated that the mobile device 104*a* is within the threshold distance, d, and within the threshold angle, θ, and therefore is located at an intent location. However, the mobile device 104*b* is beyond the threshold distance, d, and the mobile device 104*c* is outside of the threshold angle, θ. As such, neither of the mobile devices 104*b-c* is located at an intent location. Depending on the particular embodiment, the threshold distance and/or the threshold angle may be hardware-, firmware-, and/or software-defined. Further, in some embodiments, the threshold distance and/or threshold angle may be modified by the access control device 102, the management server 106, and/or another suitable device of the access control system 100.

Figure 10:
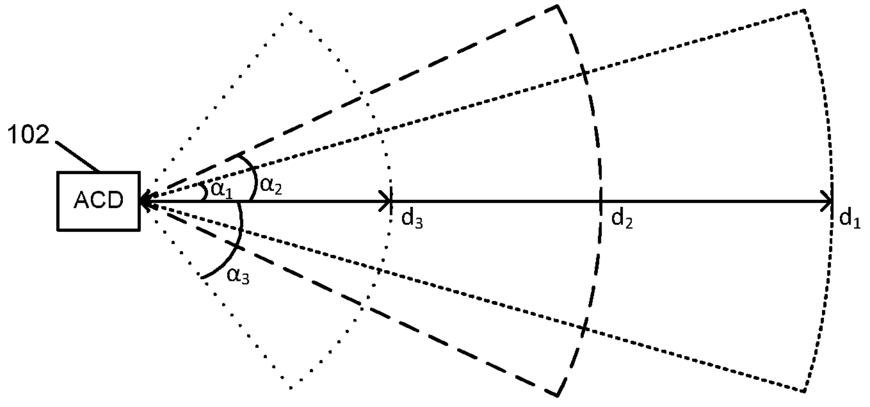

As shown in FIG. 10, it should be appreciated that the access control device 102 may utilize multiple threshold distances and/or multiple threshold angles in some embodiments. For example, in some embodiments, a set of threshold distance/angle pairs may be used. In particular, in the illustrative embodiment of FIG. 10, the access control device 102 utilizes three pairs of thresholds: ($d_1$, $\alpha_1$), ($d_2$, $\alpha_2$), and ($d_3$, $\alpha_3$). In such an embodiment, the mobile device 104 may be determined to be at an intent location if it is located at a location defined by any such pair of thresholds. As described above, the threshold angles ($\alpha_1$, $\alpha_2$, and $\alpha_3$) may alternatively be defined by the angles ($\theta_1$, $\theta_2$, and $\theta_3$) in some embodiments. Additionally, it should be appreciated that the angles may be defined in two dimensions (e.g., within a horizontal plane that intersects the access control device 102) or three dimensions depending on the particular embodiment.

Returning to FIG. 7, in some embodiments, in block 718, the access control device 102 may further determine whether the mobile device 104 is moving toward the access control device 102. In other words, in some embodiments, the determination regarding whether the mobile device 104 is moving toward the access control device 102 is an additional parameter in determining the user's access control intent (i.e., in addition to determining the user is in an intent location). For example, in some embodiments, the access control device 102 may only determine the user intends to access the passageway if both the mobile device 104 is in an intent location and the mobile device 104 is moving toward the access control device 102 (or, alternatively, not moving away from the access control device 102).

In block 720, the access control device 102 performs access control authentication (i.e., authenticates) of the mobile device 104 and/or a user of the mobile device 104 to determine whether the user of the mobile device 104 is authorized to access the passageway (e.g., whether the user is authorized to control the access control mechanism 120, such as by unlocking a lock mechanism). It should be appreciated that the access control device 102 may utilize any suitable algorithm, technique, and/or mechanism for doing so. For example, in some embodiments, the access control device 102 may evaluate a credential and/or other unique information associated with the mobile device 104 and/or a user of the mobile device 104. It should be appreciated that, in some embodiments, the access control device 102 may offload the authentication analysis, or a portion thereof, to one or more other devices of the access control system 100 (e.g., the management server 106). It should be further appreciated that the access control device 102 may determine that the user is authorized to access the passageway based on the authorization of the mobile device 104 to access the passageway and the user's possession of the mobile device 104.

If the access control device 102 determines, in block 722, that the user (or the mobile device 104) is authorized to access the passageway and the mobile device 104 has therefore been authenticated, the method 700 advances to block 724 in which the access control device 102 controls the access control mechanism 120 to allow passage. In other words, the access control device 102 may control the access control mechanism 120 to allow passage if it is determined that the mobile device 104 is in a location determined to be indicative of intent to access the passageway and the user and/or the mobile device 104 have the appropriate credential (s) (i.e., the user is authorized to access the passageway). As indicated above, in some embodiments, the access control device 102 further considers the movement of the mobile device 104 such that the access control mechanism 120 is controlled to allow passage in response to a determination that the mobile device 104 is in a location determined to be indicative of intent to access the passageway, the user and/or the mobile device 104 have the appropriate credential(s), and the mobile device 104 is moving toward the access control device 102 (or, alternatively, not moving away from the access control device 102). It should further be appreciated that, in some embodiments, the authentication may occur prior to and/or contemporaneous with the relative distance and relative angle analyses described above.

It should be appreciated that, in some embodiments, additional considerations may be considered that are not discussed herein thoroughly for brevity of the description. For example, in some embodiments, the access control device 102 may analyze sensor data received from various sensors of the access control device 102 to determine whether to control the access control mechanism 120. Such sensors may detect various characteristics of the physical environment of the access control device 102 (internal and/or external to the access control device 102), electrical characteristics of the access control device 102, electromagnetic characteristics of the access control device 102 or its surroundings, and/or other suitable characteristics. In particular, the access control device 102 may include a door position sensor configured to generate sensor data (e.g., by virtue of one or more signals) associated with a door position status, which may be interpreted by the processing device 202 of the access control device 102 to determine whether the door is in a closed position or an open position, and/or a latchbolt sensor configured to generate sensor data (e.g., by virtue of one or more signals) associated with a latchbolt status, which may be interpreted by the processing device 202 of the access control device 102 to determine whether the latchbolt is in an extended position or a retracted position. In various embodiments, additional and/or alternative sensors other than those described above may be included in the access control device 102. For example, in some embodiments, the access control device 102 may include proximity sensors, optical sensors, light sensors, electromagnetic sensors, hall effect sensors, audio sensors, temperature sensors, motion sensor, piezoelectric sensors, cameras, switches (e.g., reed switches, physical switches, etc.), inductive sensors, and/or other types of sensors. Of course, the access control device 102 may also include components and/or devices configured to facilitate the use of such sensors.

Although the blocks 702-724 are described in a relatively serial manner, it should be appreciated that various blocks of the method 700 may be performed in parallel in some embodiments.

Figure 8:
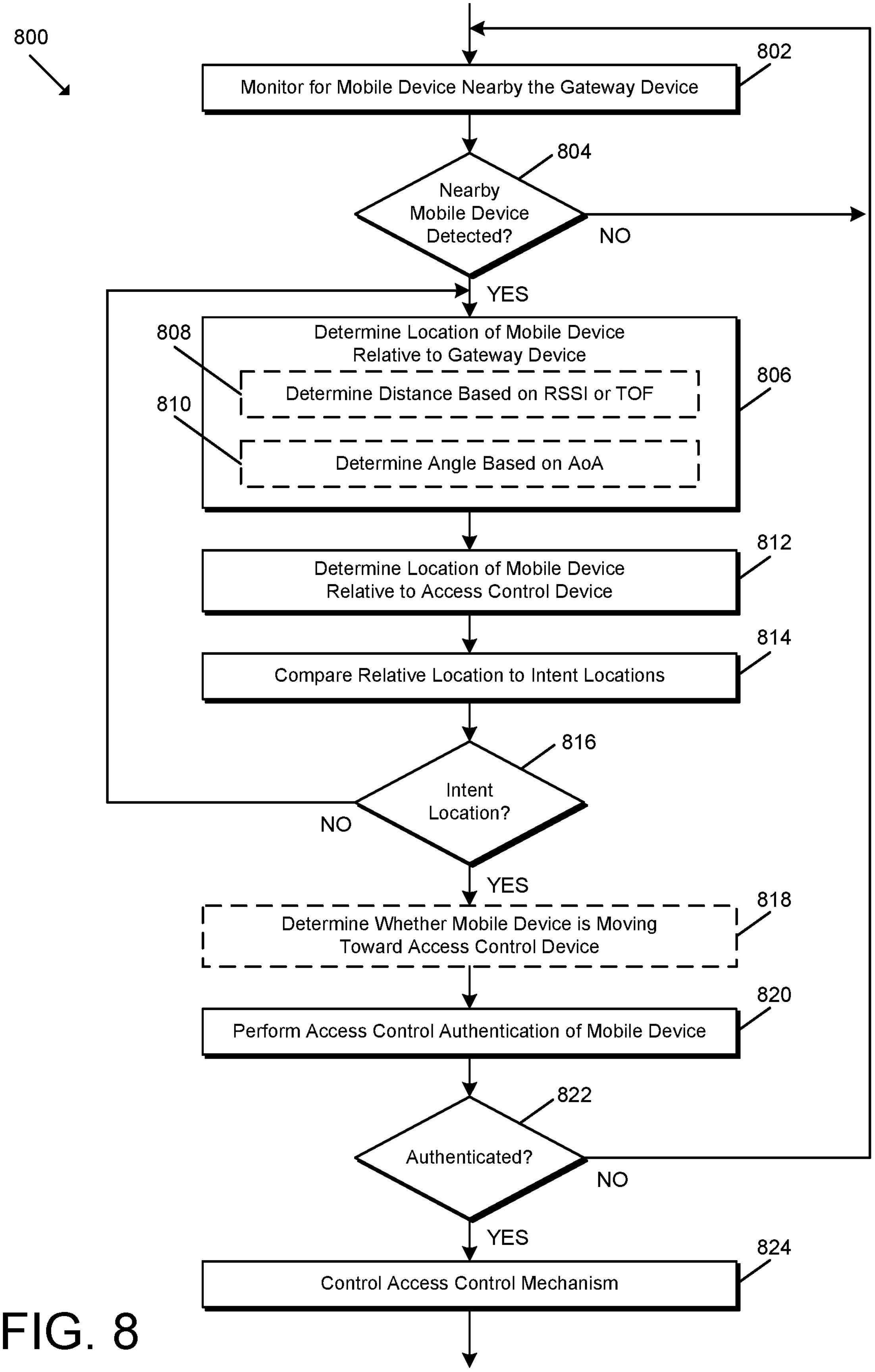
FIG. 8 is a simplified block diagram of at least one other embodiment of a method for determining an access control intent.

Referring now to FIG. 8, in use, the gateway device 108 may execute a method 800 for determining an access control intent of a user of a mobile device 104. It should be appreciated that the particular blocks of the method 800 are illustrated by way of example, and such blocks may be combined or divided, added or removed, and/or reordered in whole or in part depending on the particular embodiment, unless stated to the contrary. The illustrative method 800 begins with block 802 in which the gateway device 108 monitors for a mobile device 104 nearby the gateway device 108. To do so, the gateway device 108 may perform functions similar to the access control device 102 described in reference to block 702 of FIG. 7.

In block 804, the gateway device 108 determines whether a nearby mobile device 104 has been identified. If not, the method 800 returns to block 802 in which the gateway device 108 continues to monitor for nearby mobile devices 104. If a nearby mobile device 104 has been detected, the method 800 advances to block 806 in which the gateway device 108 determines a location of the mobile device 104 relative to the gateway device 108 (e.g., based on a signal distance traveled, or an estimation thereof, and an angle of arrival of a signal received by an antenna array 122 of the gateway device 108 from the mobile device 104). In particular, in block 808, the gateway device 108 may determine/estimate a distance of the mobile device 104 from the gateway device 108 based on RSSI or TOF and, in block 810, the gateway device 108 may determine the angle of arrival based on AoA (e.g., based on measurements of a time difference of arrival of the signal at a plurality of antennas in the antenna array 122 of the gateway device 108). It should be appreciated that the gateway device 108 may determine the relative angle and distance of the mobile device 104 based on techniques similar to those described above.

In block 812, the gateway device 108 determines a location of the mobile device 104 relative to the access control device 102 based on the location of the mobile device 104 relative to the gateway device 108. For example, in some embodiments, the gateway device 108 may make such a determination based on predetermined spatial relationships between the access control device 102 and the gateway device 108. In block 814, the gateway device 108 determines whether the location of the mobile device 104 relative to the access control device 102 is indicative of an intent by the user of the mobile device 104 to access the passageway (e.g., a doorway secured by the access control device 102). More specifically, the gateway device 108 may compare the relative location to one or more intent locations that are indicative of such intents. Depending on the particular embodiment, the intent locations may be described in any suitable way. For example, in some embodiments, the intent locations may be described by a threshold angle/distance pair similar to the techniques described above. In other embodiments, the intent locations may be described, for example, by relative or absolute coordinates.

If the gateway device 108 determines, in block 816, that the mobile device 104 is not at an intent location, the method 800 returns to block 806 in which the gateway device 108 again determines the location of the mobile device 104 relative to the gateway device 108 and, based on that determination, again determines the location of the mobile device 104 relative to the access control device 102. In other words, the gateway device 108 may monitor the location of the mobile device 104 over time as the mobile device 104 moves relative to the gateway device 108 and/or the access control device 102. It should be appreciated that, in some embodiments, the gateway device 108 may determine and analyze the relative distance and relative angle of the mobile device 104 in parallel. Additionally, in some embodiments, it should be appreciated that the gateway device 108 may monitor the location of, and perform the functions described herein with respect to, multiple mobile devices 104 simultaneously.

In some embodiments, in block 818, the gateway device 108 may further determine whether the mobile device 104 is moving toward the access control device 102. Further, in some embodiments, the gateway device 108 may only determine the user intends to access the passageway if both the mobile device 104 is in an intent location and the mobile device 104 is moving toward the access control device 102 (or, alternatively, not moving away from the access control device 102).

In block 820, the gateway device 108 performs access control authentication (i.e., authenticates) of the mobile device 104 and/or a user of the mobile device 104 to determine whether the user of the mobile device 104 is authorized to access the passageway (e.g., whether the user is authorized to control the access control mechanism 120, such as by unlocking a lock mechanism). It should be appreciated that the gateway device 108 may utilize any suitable algorithm, technique, and/or mechanism for doing so. For example, in some embodiments, the gateway device 108 may evaluate a credential and/or other unique information associated with the mobile device 104 and/or a user of the mobile device 104. It should be appreciated that, in some embodiments, the gateway device 108 may offload the authentication analysis, or a portion thereof, to one or more other devices of the access control system 100. For example, in some embodiments, the access control device 102 itself may perform the authentication. In other embodiments, the gateway device 108 may offload the analysis to the management server 106 or the access control panel 110. It should be further appreciated that the relevant device(s) of the access control system 100 may determine that the user is authorized to access the passageway based on the authorization of the mobile device 104 to access the passageway and the user's possession of the mobile device 104.

If the gateway device 108 determines, in block 822, that the user (or the mobile device 104) is authorized to access the passageway and the mobile device 104 has therefore been authenticated, the method 800 advances to block 824 in which the access control device 102 controls the access control mechanism 120 to allow passage. For example, in some embodiments, the gateway device 108 may transmit a signal or message to the access control device 102 instructing the access control device 102 to control the access control mechanism 120 to allow passage. Similar to the method 700 of FIG. 7 described above, the gateway-based analytics described in reference to FIG. 8 involve the access control device 102 controlling the access control mechanism 120 to allow passage if it is determined that the mobile device 104 is in a location determined to be indicative of intent to access the passageway and the user and/or the mobile device 104 have the appropriate credential(s) (i.e., the user is authorized to access the passageway). As indicated above, in some embodiments, the gateway device 108 may further consider the movement of the mobile device 104 such that the access control mechanism 120 is controlled to allow passage in response to a determination that the mobile device 104 is in a location determined to be indicative of intent to access the passageway, the user and/or the mobile device 104 have the appropriate credential(s), and the mobile device 104 is moving toward the access control device 102 (or, alternatively, not moving away from the access control device 102). It should further be appreciated that, in some embodiments, the authentication may occur prior to and/or contemporaneous with the relative distance and relative angle analyses described above.

Although the blocks 802-824 are described in a relatively serial manner, it should be appreciated that various blocks of the method 800 may be performed in parallel in some embodiments.

Figure 11:
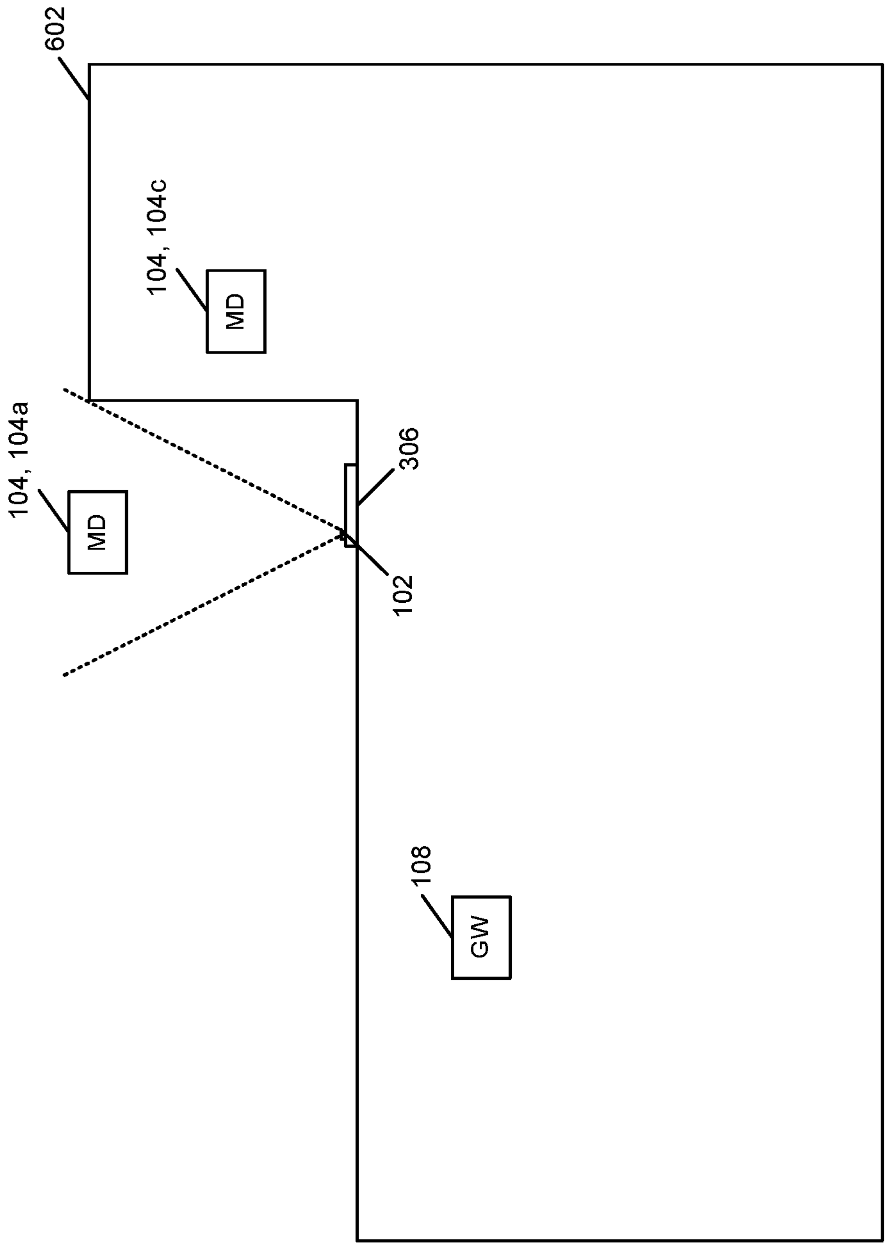
FIG. 11 illustrates a building including the access control system of FIG. 1.

FIG. 11 depicts an environment of the access control system 100 involving a building 602. As shown, the mobile device 104*c* is illustrated within the building 602 yet on an "exterior side" of the door 306. The techniques described herein would appreciate that, while the mobile device 104*c* is near the access control device 102 and on an "exterior side" of the access control device 102, the mobile device 104*c* is outside of the threshold angle and therefore an access control intent is not conveyed. As such, FIG. 11 illustrates at least one circumstance in which a simple determination regarding whether the mobile device 104 is nearby the access control device 102 and/or on a particular side of the access control device 102 (e.g., an "exterior side" of the door 306) is inferior to the techniques described herein.

Although described primarily in reference to unlocking a lock mechanism, it should be appreciated that the techniques described herein may be applied to control of other access control mechanisms and/or other access control circumstances. For example, in some embodiments, the techniques described herein may be applied to the control of access to a different type of passageway, such as an elevator. In particular, in some embodiments, the user of the mobile device 104 may be waiting for an elevator that includes the access control device 102 such that the access control device 102 or a nearby gateway device 108 (e.g., within the elevator control panel) may confirm the user's floor access credentials as the user approaches and/or waits for the elevator, thereby eliminating the need to present credentials inside the elevator, for example, to access a limited-access floor. In another embodiment, a "door-less" passageway with video monitoring may be configured to signal an alarm if a person passes through the passageway without the credential being first detected within an intent location as described above.

What is claimed is:

1. A method, comprising:

determining, by a lock device that controls access to a passageway via a lock mechanism at least partially positioned within a housing of the lock device, a location of a mobile device relative to the lock device based on a signal distance traveled and an angle of arrival of a signal received from the mobile device by an antenna array positioned within the housing of the lock device, wherein determining the location of the mobile device relative to the lock device comprises estimating the signal distance traveled based on a received signal strength indicator of the signal;

determining, by the lock device, whether the location of the mobile device relative to the lock device is a location that indicates an intent of the user of the mobile device to access the passageway; and unlocking, by the lock device, the lock mechanism of the lock device in response to a determination that the location of the mobile device relative to the lock device indicates that the user intends to access the passageway.

2. The method of claim 1, wherein determining the location of the mobile device relative to the lock device comprises determining the angle of arrival of the signal based on measurements of a time difference of arrival at a plurality of antennas in an antenna array of the lock device.

3. The method of claim 1, wherein determining whether the location of the mobile device relative to the lock device is a location that indicates that the user intends to access the passageway comprises determining whether the distance is within a threshold distance and the angle of arrival is within a threshold angle.

4. The method of claim 1, further comprising authenticating the mobile device to determine whether the user of the mobile device is authorized to access the passageway; and wherein unlocking the lock mechanism comprises unlocking the lock mechanism in response to a determination that (i) the location of the mobile device relative to the lock device indicates that the user intends to access the passageway and (ii) the user of the mobile device is authorized to access the passageway.

5. The method of claim 1, further comprising determining, by the lock device, whether the mobile device is moving toward the lock device.

6. The method of claim 5, wherein unlocking the lock mechanism comprises unlocking the lock mechanism in response to a determination that (i) the location of the mobile device relative to the lock device indicates that the user intends to access the passageway, (ii) the user of the mobile device is authorized to access the passageway, and (iii) the mobile device is moving toward the lock device.

7. A lock device, comprising:

a housing;

a lock mechanism at least partially positioned within the housing and adapted to control access to a passageway;

an antenna array including a plurality of antennas positioned within the housing;

a processor; and a memory comprising a plurality of instructions stored thereon that, in response to execution by the processor, causes the lock device to:

determine a location of a mobile device relative to the lock device based on a signal distance traveled and an angle of arrival of a signal received from the mobile device;

determine whether the location of the mobile device relative to the lock device is a location that indicates an intent of the user of the mobile device to access the passageway; and control the lock mechanism to allow access to the passageway in response to a determination that the location of the mobile device relative to the lock device indicates that the user intends to access the passageway.

8. The lock device of claim 7, wherein to determine the location of the mobile device relative to the lock device comprises to determine the signal distance traveled of the signal based on a time of flight of the signal.

9. The lock device of claim 7, wherein to determine the location of the mobile device relative to the lock device comprises to estimate the signal distance traveled based on a received signal strength indicator of the signal.

10. The lock device of claim 7, wherein to determine the location of the mobile device relative to lock device comprises to determine the angle of arrival of the signal based on measurements of a phase difference of the signal at a time of arrival of the signal at the plurality of antennas.

11. The lock device of claim 7, wherein to determine the location of the mobile device relative to the lock device comprises to determine a distance of the mobile device relative to the lock device based on the signal distance traveled; and wherein to determine whether the location of the mobile device relative to the lock device is a location that indicates that the user intends to access the passageway comprises to (i) determine whether the distance is within a first threshold distance and the angle of arrival is within a first threshold angle and (ii) determine whether the distance is within a second threshold distance and the angle of arrival is within a second threshold angle.

12. The lock device of claim 7, wherein the plurality of instructions further causes the lock device to authenticate the mobile device to determine whether the user of the mobile device is authorized to access the passageway.

13. The lock device of claim 12, wherein to control the lock mechanism comprises to unlock the lock mechanism in response to a determination that (i) the location of the mobile device relative to the lock device indicates that the user intends to access the passageway and (ii) the user of the mobile device is authorized to access the passageway.

14. The lock device of claim 7, wherein the plurality of instructions further causes the lock device to determine whether the mobile device is moving toward the lock device.

15. The lock device of claim 14, wherein to control the lock mechanism comprises to control the lock mechanism to allow access to the passageway in response to a determination that (i) the location of the mobile device relative to the lock device indicates that the user intends to access the passageway, (ii) the user of the mobile device is authorized to access the passageway, and (iii) the mobile device is moving toward the lock device.

16. The lock device of claim 7, further comprising a printed circuit board electrically coupled to the processor; and wherein each antenna of the plurality of antennas is secured to the printed circuit board.

17. The lock device of claim 7, wherein the plurality of antennas comprises a first whip antenna, a second whip antenna, and a third whip antenna;

wherein the first whip antenna, the second whip antenna, and the third whip antenna are arranged in an equilateral triangular configuration such that (i) the first whip antenna is positioned a first distance from the second whip antenna, (ii) the first whip antenna is positioned the first distance from the third whip antenna, and (iii) the second whip antenna is positioned the first distance from the third whip antenna.

18. The method of claim 1, wherein determining whether the location of the mobile device relative to the lock device is a location that indicates that the user intends to access the passageway comprises:

determining whether the distance is within a first threshold distance and the angle of arrival is within a first threshold angle; and determining whether the distance is within a second threshold distance and the angle of arrival is within a second threshold angle.

19. The lock device of claim 7, wherein to control the lock mechanism comprises to control the lock mechanism to allow access to the passageway in response to a determination that the location of the mobile device relative to the lock device indicates that the user intends to access the passageway and based on door position sensor data that indicates whether a door associated with the passageway is in an open position or a closed position.

* * * * *